F. MILLIKEN.
COMBINED Y-VALVE AND HOSE CONNECTION.
APPLICATION FILED FEB. 19, 1916.
1,230,007.
Patented June 12, 1917.
5 SHEETS—SHEET 1.
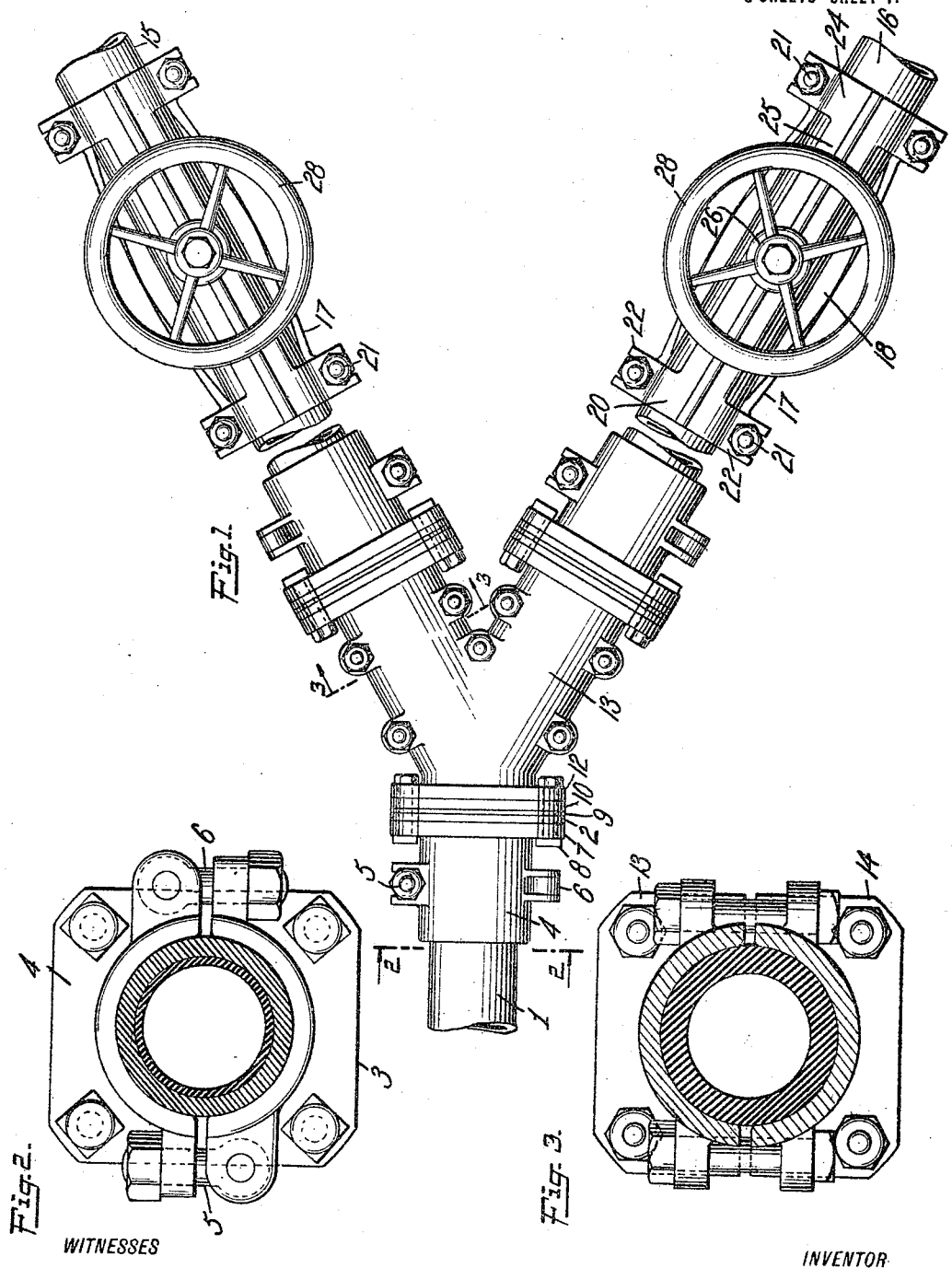
WITNESSES
George L. Blume.
A. L. Kitchin
INVENTOR
Foster Milliken
BY
ATTORNEYS

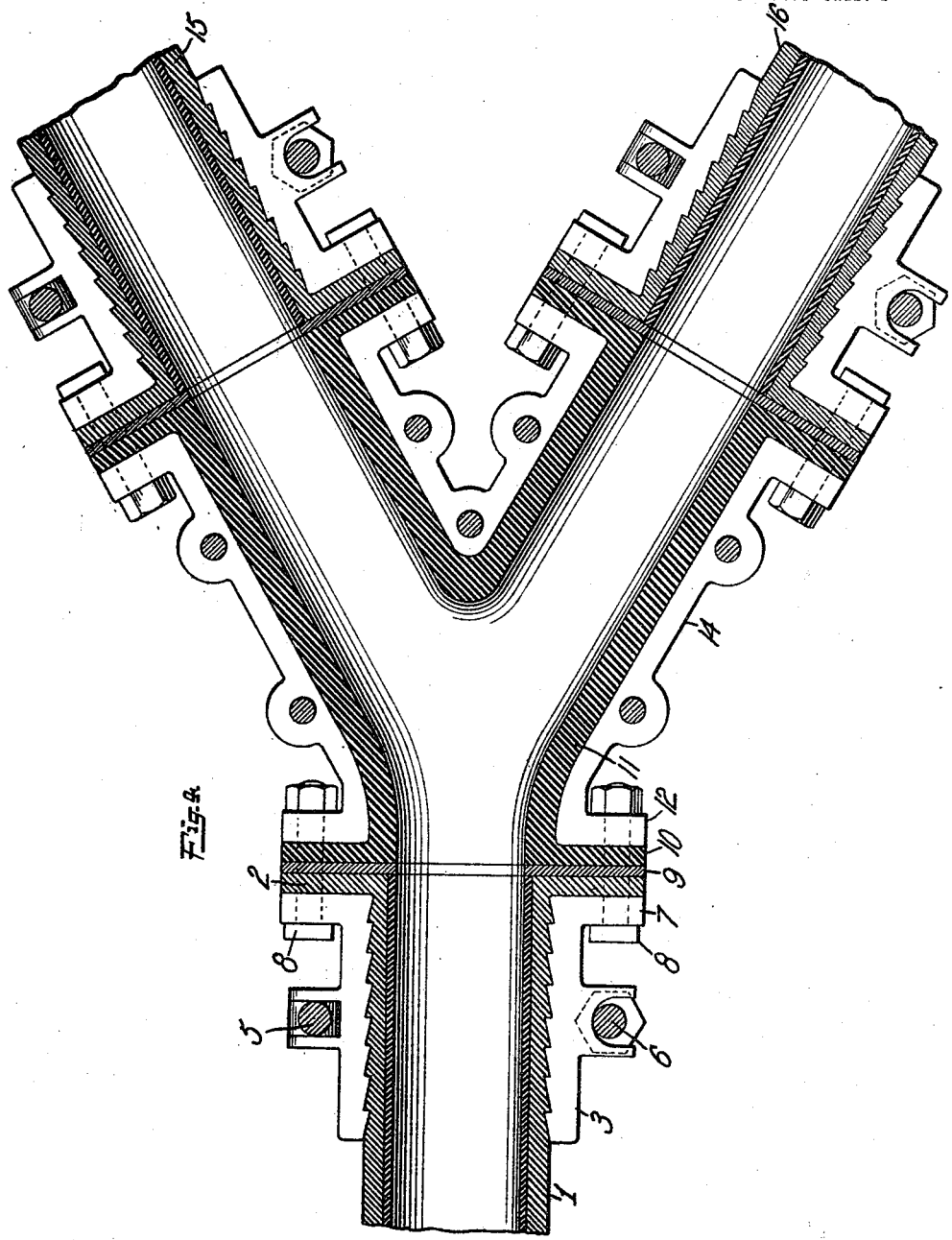

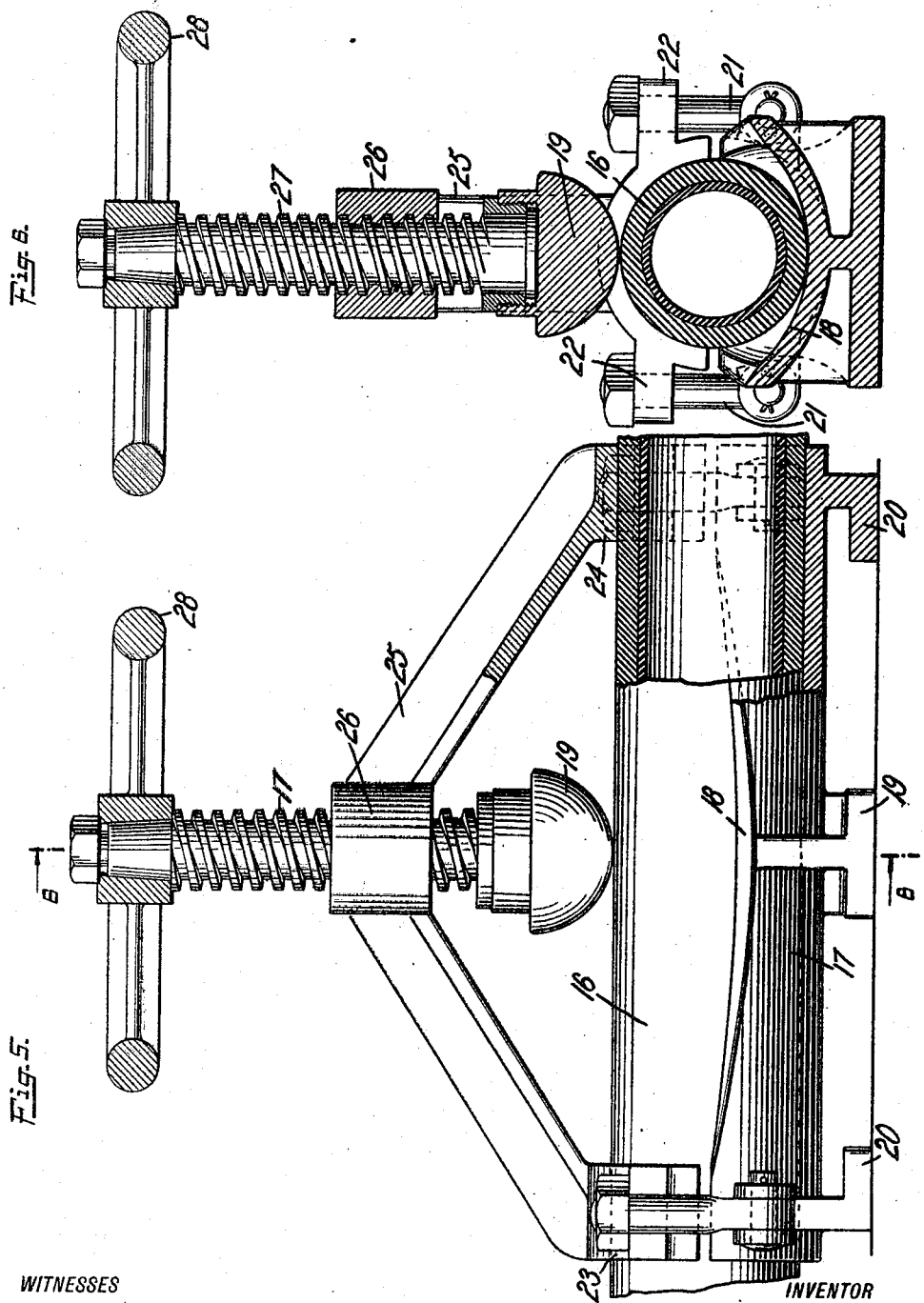

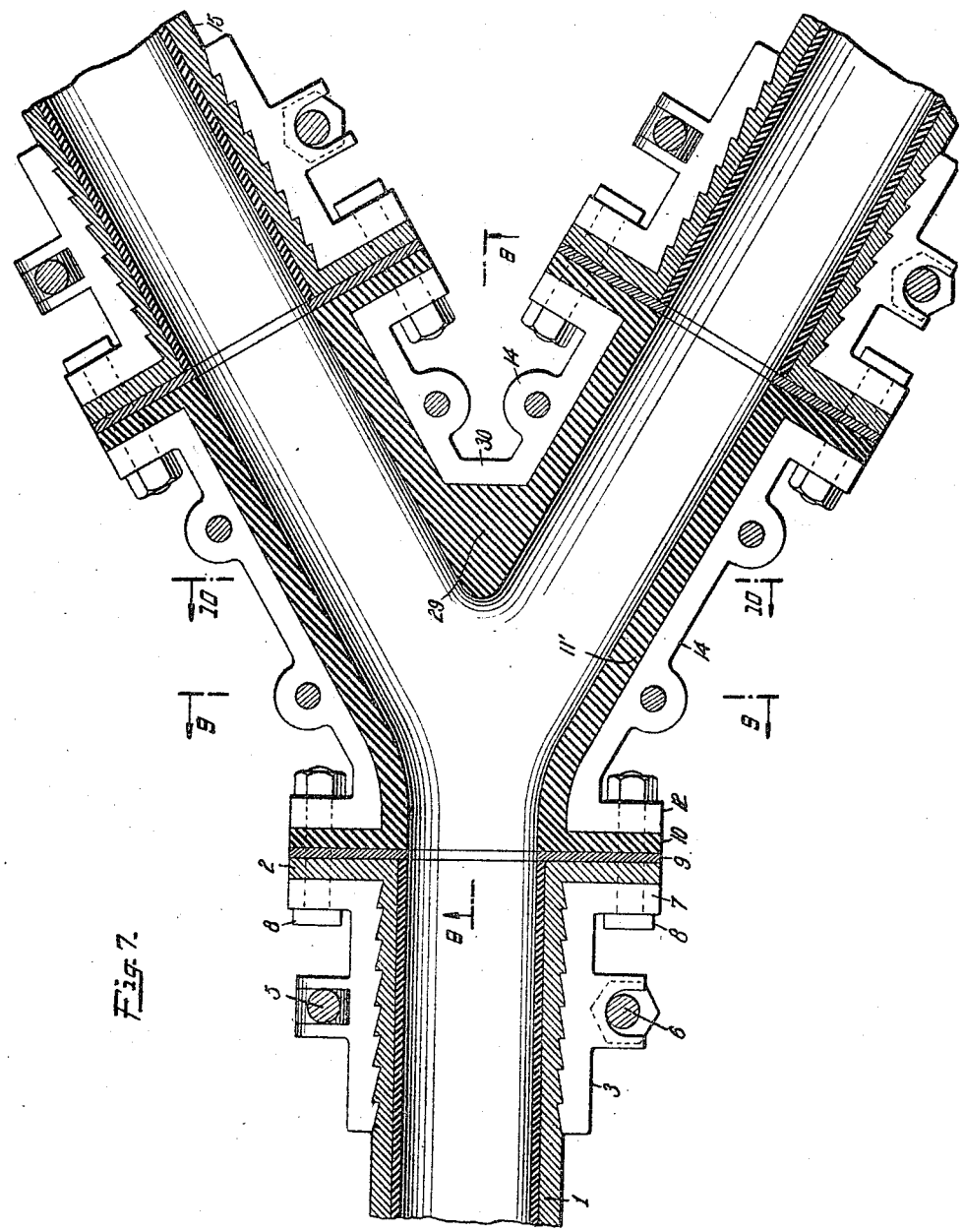

F. MILLIKEN.
COMBINED Y-VALVE AND HOSE CONNECTION.
APPLICATION FILED FEB. 19, 1916.
1,230,007.
Patented June 12, 1917.
5 SHEETS—SHEET 5.
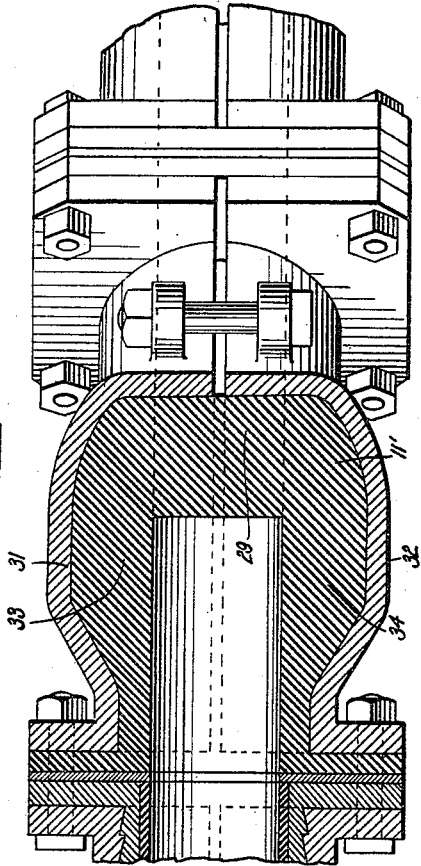
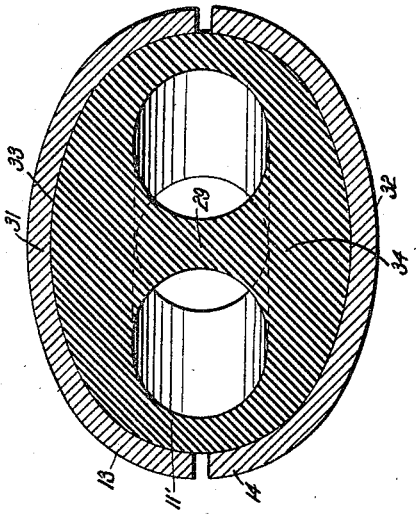
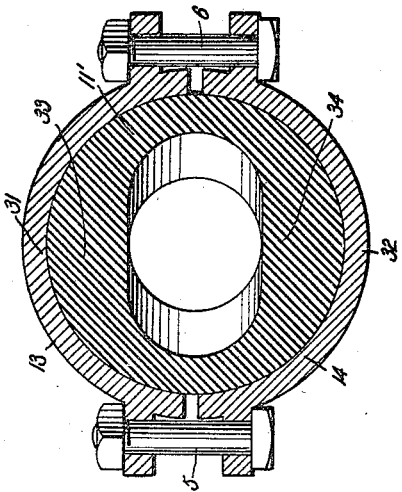
Inventor
Foster Milliken

UNITED STATES PATENT OFFICE.

FOSTER MILLIKEN, OF LAWRENCE, NEW YORK.

COMBINED Y-VALVE AND HOSE CONNECTION.

1,230,007.  Specification of Letters Patent.  Patented June 12, 1917.

Application filed February 19, 1916. Serial No. 79,346.

*To all whom it may concern:*

Be it known that I, FOSTER MILLIKEN, a citizen of the United States, and a resident of Lawrence, in the county of Nassau and State of New York, have invented a new and Improved Combined Y-Valve and Hose Connection, of which the following is a full, clear, and exact description.

This invention relates to hose connections and distributing valves and particularly to a hose connection and Y-valve for distributing by a fluid, as for instance, water, gas, compressed air and the like, granular or abrading matter of any kind, as for instance, sand, cracked stone, gravel, mixed concrete and the like, and has for an object the provision of an improved construction which will wear for a comparatively long time while permitting a continuous discharge of material when the device is in use.

Another object in view is to provide a Y-connection having any desired number of branches and a lining therefor formed of rubber or other material having the same characteristics as rubber so as to protect the connection against wear caused by the passing of abrading or granular matter of any kind through the connection.

A further object is to provide a Y-connection with a lining of rubber or other material having the same characteristics as rubber and associated connecting members for connecting the rubber lined hose whereby nothing but the rubber lining of the hose and the Y-connection is brought into engagement with the matter passing through the hose and connection.

A still further object in view, more specifically, is to provide a rubber hose acting as a source of supply, a Y-connection secured thereto having a rubber lining, and a valve mechanism for collapsing the hose secured to one of the arms of the Y-connection so that only one arm of the Y is used at a given time, thus allowing the matter passing through the hose and Y-connection to be distributed at different points without shutting off the main supply.

In the accompanying drawings:—

Figure 1 is a top plan view of a connection and associated parts disclosing an embodiment of the invention.

Fig. 2 is a section through Fig. 1 on line 2—2, the same being shown on an enlarged scale.

Fig. 3 is a section through Fig. 1 on line 3—3, the same being on an enlarged scale.

Fig. 4 is a longitudinal horizontal section through the Y construction shown in Fig. 1.

Fig. 5 is a side view of one of the valves shown in Fig. 1, the same being shown on an enlarged scale and partially broken away for better illustrating the construction.

Fig. 6 is a section through Fig. 5 on line 6—6.

Fig. 7 is a view similar to Fig. 4 but showing a slightly modified construction for disclosing a reinforced section at the point of greatest wear.

Fig. 8 is a longitudinal section through Fig. 7 on line 8—8.

Fig. 9 is a transverse section through Fig. 7 on line 9—9.

Fig. 10 is a transverse section through Fig. 7 on line 10—10.

In constructing an embodiment of the invention the aim is to produce a strong construction which may readily withstand the more or less rough usage of distributing granular matter of various kinds which abrade to a greater or less extent the distributing member. The device is especially adapted to distribute sand, cracked stone, gravel, mixed concrete and other materials which have an abrading characteristic but which may be forced through a pipe or hose by compressed air, water, gas or other liquid or gaseous matter and distributed to the various points desired. Heretofore various discharge nozzles and discharge members have been produced made from metal of different kinds. These metal nozzles or discharge members operate properly but wear very fast as the granular or other matter passing therethrough grind the same away in a comparatively short time, especially where there is a branch in the pipe. By using a construction embodying the present invention the objection to wear has been almost eliminated, as the distributing members and the Y-connection or branch structure are lined with rubber or other material having the same wearing characteristics as rubber, whereby the granular matter, as mixed concrete, sand, gravel and cracked stone, cannot come in direct engagement with any metal part. In this specification the term rubber will be understood as meaning rubber or any other material having the same wearing characteristics as rubber, and also, the term granular may mean anything formed of small particles which it is desired to distribute. Rubber is preferred as the same has the property of giving and moving out of the way when the granular matter attempts to abrade or cut away part thereof, thus withstanding the grinding effect of said granular matter for a very long time. This is of extreme advantage where a branch or Y-connection is used, as the material must change direction at this point and would naturally wear excessively when changing direction. The Y-connection is a desirable feature as otherwise the source of supply or the main feed pipe must be stopped when it is desired to shift the position of one of the discharge hose or nozzles. By the use of the Y-connection, two, or if desired, more discharge nozzles are presented but usually only one is used at a given time and when it is desired to discharge the granular matter at a different point said granular matter is switched to one of the unused discharge nozzles or members and the opposite member is then shifted to a new position as may be desired. The distribution of concrete or other granular matter by a hose and the connection as mentioned is of importance where the space of operation is limited, as for instance in digging tunnels, subways and the like.

Referring to the accompanying drawings by numerals, 1 indicates a hose provided with a rubber lining and at the end provided with a turned-up portion 2 (Fig. 4) which is usually canvas and rubber mixed. The flange 2 is provided so that the hose 1 may be readily clamped in position by the clamping members 3 and 4 (Fig. 2) which clamping members are held in position by suitable bolts 5 and 6. The inner face of the clamping members 3 and 4 may be roughened or corrugated, as shown more particularly in Fig. 4, so as to grip the hose 1. The clamping members 3 and 4 are each provided with a flange 7 for receiving the various bolts 8, said bolts passing through the flange 2, a fiber gasket 9, a flange 10 of the rubber lining 11 and flange 12 of the Y-clamping members 13 and 14. The fiber washer 9 is preferable as the parts are clamped firmly together and the opposite faces of the rubber would adhere to greater or less extent and to a limited extent would become more or less vulcanized together if this washer or subsidiary rubber was not provided. During the use of the entire construction the fact that the parts were vulcanized together would not be objectionable, but when it is desirable to renew the lining in the Y-connection it then becomes necessary to remove the old lining and if the old lining were vulcanized to the end of the hose the flange of the hose would be damaged in disengaging the parts.

The Y-clamping members are formed identical with the clamping members 3 and 4 except that they are formed in the shape of the letter Y so that the discharge or distributing hose 15 and 16 may be connected therewith as shown clearly in Fig. 4. This connection is the same as described in regard to clamps 3 and 4 so that a further description is not thought to be necessary.

The hose 15 and 16 are rubber lined but are reinforced on the outside by canvas impregnated with rubber in the usual manner of providing hose of this character. However, the lining 11 is made preferably of rubber throughout, the same being also preferably of a good quality. It is of course understood that the rubber lining 11 does not possess any considerable strength but as the same is entirely surrounded by the clamping members 13 and 14 it cannot be moved out of place and acts thoroughly as a wearing lining for said clamps. If it should be desired to connect up any hose of the Y branching device the same may be done easily by turning up the end of the hose when the same is not provided with the flange 2.

In using the device it is very desirable to continually use the hose 1 and, consequently, not to shut down the device which forces the granular matter therethrough. In order to do this one of the branches or arms of the Y must be maintained open continuously. If an ordinary valve construction involving metal parts coming in contact with the granular matter is to be used for turning off or shutting off the flow of granular matter through one of the arms of the Y, or from one of the hose or pipes 15 and 16, such construction would be worn away quickly. However, an improved arrangement of valve is provided in connection with the hose or pipes 15 and 16, as shown in Figs. 1, 5 and 6, which involves the principle of collapsing of this hose whenever it is desired to shut off the flow of granular matter therethrough. It is to be understood that the granular matter of whatever nature is to be forced through the pipe or hose 1 and also through the arms of the Y by any suitable vehicle, as for instance, compressed air, air, water, gas or other liquid or gaseous matter.

Referring more particularly to Figs. 5 and 6 it will be seen that the valve structure is arranged to collapse a flexible hose without injuring the same and also without causing any metal parts to come in contact with the granular matter. A base 17 is provided which is substantially semicircular at the ends and gradually widens at the center for providing an almost flat compression seat 18, as shown in Fig. 6, and above the compression seat 18 is a semiglobular head 19 adapted to be forced against the hose so that the same, in a certain sense, will be pinched together or collapsed and thus the passageway obstructed. The base 17 may, if desired, be provided with suitable supporting feet 20 and pivotally mounted bolts 21 which extend through bifurcated extensions 22 on the arc-shaped ends 23 and 24 of the truss 25. The truss 25 is provided with an enlargement 26 having a threaded aperture therein through which the threaded shaft 27 passes, said threaded shaft being connected with the head 19 and also with an operating wheel 28 whereby the head may be raised and lowered at any time even against a filling of granular matter in the hose. However, ordinarily the hose is reasonably free of concrete or other granular matter when the same is collapsed so that there will be no hardening of a batch of concrete in that particular arm of the distributing Y.

In building concrete structures, especially in tunnels and other places where the granular matter is to be deposited in a very restricted place, it is very desirable to keep the concrete flowing continually through the supply hose 1 but to shift the discharge hose or nozzles as the particular deposit is properly laid. By providing a Y-shaped distributing member as shown in Figs. 1 and 4, one arm can be discharging while the other arm is idle, and the second arm discharging when the first is being shifted to a new position, thus allowing a continuous discharge even though the device is being moved as the work demands. In each part of the device a rubber member is presented to the concrete while proper reinforcing members hold the rubber in place, and proper valve constructions as shown in Figs. 5 and 6 are used for shutting off the flow in either of the discharge hose, as may be necessary. It is also to be noted that the clamping members are divided into parts and bolted together. This is desirable, as it allows the rubber lining 11 to be made with integrally formed flanges and also allows the use of flanges on the ends of the various hose used, thus permitting rubber to be brought into contact with rubber, whereby any wearing at a connection is eliminated. Fiber washers 9 may be used or, if desired, rubber gaskets may be substituted at this point.

Referring more particularly to Figs. 7 to 10, inclusive, it will be seen that a slightly modified form of the invention is disclosed which is designed to especially take care of material having greater abrading qualities and where the work is being done under some considerable pressure or speed. Referring to these figures by numerals, 11' indicates the rubber lining which is constructed similar to that disclosed in the preferred form and illustrated in Fig. 4 except that the point or section 29 which is thickened to an appreciable extent as it is directly opposite the opening in the supply or hose 1 and thereby receives the greatest impact and sustains the greatest wear. It is aimed to provide an extra thickness at this point which will cause this point to wear as long as the remaining part so that practically all of the lining will wear out simultaneously after an appreciable time. The clamping members 13 and 14 in this form of the invention are similar to the preferred form except that at point 30 one of the bolts is eliminated and the space occupied by the bolt and surrounding part is used for accommodating the extra thick section 29. In addition to changing the clamping members 13 and 14 as just described for accommodating the thickened point 29 the sides, or what may be termed the top 31 and bottom 32 are bulged out so that the lining at points 33 and 34 (Fig. 8) may be made extra thick for resisting extra wear at these points. It is understood that the extra thickness at section 29 and the points 33 and 34 gradually merge into the surrounding or adjacent parts of the lining so there will be no abrupt changes in the exterior of the lining.

The interior passageways of the lining are preferably of the same diameter throughout as in the preferred form so that there will be no obstruction whatever to the free and easy passage of the granular matter. The extra thick sections or points 33 and 34 are desirable as it is found necessary and convenient at certain times to allow the supply hose 1 to sag downwardly and thereby discharge in a certain sense in an angle up-wardly or to cause the supply hose to be in the opposite position and thereby discharge at an angle downwardly, thus causing an extra wear on the top and bottom of the lining. The extra thick sections 33 and 34 take care of this way of positioning the hose. If the hose should be moved to one side laterally an extra thickness is not necessary as it would merely cause, if possible, a direct discharge down one of the arms of the connection. In regard to the connection it is observed that only two arms are provided so as to produce a Y construction but it is evident that more arms may be used under some circumstances, if desired, without departing from the spirit of the invention.

What I claim is:—

1. In a device of the character described, a Y-connection provided with a metallic casing divided longitudinally into parts, an integrally constructed rubber lining for said casing covering the interior thereof, said lining being provided with a flange at its base and a flange at the outer end of each of the arms, said flanges overlapping flanges on said casing, means for clamping a rubber lined hose against the flange on said base, and independent means for clamping a rubber lined hose against each of the flanges of said arms whereby material flowing into the Y-connection may be distributed without coming in contact with metal.

2. In a device of the character described, a casing provided with an intake section and a plurality of radiating arms therefrom, and a lining of rubber covering the interior of said casing, said lining having its top and bottom thickened at the point where said intake section and said arms merge.

3. In a device of the character described, a casing provided with an intake section, and a plurality of radiating arms, and a lining of rubber covering the interior of said casing, said lining having its top and bottom thickened at the point where the arms and intake section merge and also thickened where the arms merge opposite and in line with said intake section.

4. In a device of the character described, a casing provided with an intake section and a plurality of radiating arms, said intake section being bulged outwardly on opposite sides at the point where the intake section and the arms merge, and a lining of rubber for said casing, said lining having an intake opening and radiating openings, all of said openings having the same diameter whereby the part of the lining adjacent the bulged portion of the casing is thicker than the remaining part.

5. In a device of the character described, the combination with a collapsing hose, of a valve therefor, said valve comprising a seat formed at each end so as to substantially fit the curvature of the hose and at the center to be broadened out, means for collapsing the hose against the broadened-out portion of the seat, and fulcrum members for connecting said means with said seat so that the valve may be used in any position.

6. In a device of the character described, the combination with a flexible hose, of a valve for shutting off the flow of material from said hose, said valve comprising a base having a widened comparatively flat seat in the center and arc-shaped ends conforming to the shape of the hose, a yoke having arc-shaped ends arranged opposite the arc-shaped ends of the base, means for clamping said arc-shaped ends together so that they will snugly fit the hose, and a traveling member arranged on said yoke, said traveling member having a head formed thereon adapted to engage said hose and collapse the same at the widened flattened portion of the hose whereby the passageway in the hose is obstructed.

In testimony whereof I have signed my name to this specification in the presence of two subscribing witnesses.

FOSTER MILLIKEN.

Witnesses:
HENRY S. LEACH,
WILLIAM DEPPEL.